United States Patent
Mani et al.

(10) Patent No.: US 7,248,217 B2
(45) Date of Patent: Jul. 24, 2007

(54) AVERAGE EIRP CONTROL OF MULTIPLE ANTENNA TRANSMISSION SIGNALS

(75) Inventors: Sanjay Mani, Palo Alto, CA (US); Adam L. Schwartz, San Carlos, CA (US)

(73) Assignee: Tzero Technologies, Inc., Sunnyale, CA (US)

( * ) Notice: Subject to any disclaimer, the term of this patent is extended or adjusted under 35 U.S.C. 154(b) by 2 days.

(21) Appl. No.: 11/216,497

(22) Filed: Aug. 31, 2005

(65) Prior Publication Data

US 2007/0046539 A1    Mar. 1, 2007

(51) Int. Cl.
G01S 3/16     (2006.01)
H04B 7/005    (2006.01)

(52) U.S. Cl. .................. 342/383; 342/154; 342/367
(58) Field of Classification Search ............. 342/154, 342/354, 368, 372–373, 383, 367; 455/522, 455/523
See application file for complete search history.

(56) References Cited

U.S. PATENT DOCUMENTS

| 6,320,540 | B1 | 11/2001 | Meredith |
| 6,856,284 | B1 | 2/2005 | Cangiani |
| 2003/0202533 | A1 * | 10/2003 | Taylor .................. 370/468 |
| 2004/0137952 | A1 * | 7/2004 | Umesh et al. ......... 455/562.1 |
| 2004/0156443 | A1 * | 8/2004 | Dent ..................... 375/267 |
| 2004/0242275 | A1 | 12/2004 | Corbett et al. |
| 2005/0192058 | A1 * | 9/2005 | Jung et al. ............. 455/562.1 |
| 2005/0239404 | A1 * | 10/2005 | Karabinis ............... 455/12.1 |
| 2005/0239464 | A1 * | 10/2005 | Iacono .................. 455/436 |
| 2006/0135070 | A1 * | 6/2006 | Karabinis ............... 455/63.1 |

OTHER PUBLICATIONS

Multipath Beanforming for Di Wu et al., WINLAB, Rutgers Univ. UWB Receiver.

* cited by examiner

*Primary Examiner*—Dao Phan
(74) *Attorney, Agent, or Firm*—Brian R. Short

(57) ABSTRACT

A method of controlling multiple antenna signal transmission is disclosed. The method includes adjusting signal parameters so that transmission signals from a plurality of antennas combine to form a directional beam. A time duration in which the transmission signals are directed is controlled so that an average EIRP does not exceed a predetermined threshold.

28 Claims, 7 Drawing Sheets

AVERAGE EIRP CONTROL OF MULTIPLE ANTENNA TRANSMISSION SIGNALS

FIELD OF THE INVENTION

The invention relates generally to communication systems. More particularly, the invention relates to a method and apparatus for controlling radiated signal power levels by controlling signals transmitted by multiple antennas.

BACKGROUND OF THE INVENTION

Ultra-wideband (UWB) modulation provides very low-powered, high data rate radio communications for transferring data using very wide modulation bandwidths. FIG. 1 shows a typical application of UWB communication links used for indoor wireless communications. Several transceivers, for example, transceivers 110, 120, 130, 140 are networked allowing high bandwidth communications between the transceivers 110, 120, 130, 140. The transceivers 110, 120, 130, 140 can include, for example, a high definition television (HDTV) monitor networked with other devices, such as, a digital video recorder (DVR), a digital video disk (DVD) player and a computing device.

The Federal Communications Committee (FCC) has mandated that UWB radio transmission can legally operate in the frequency range of 3.1 GHz to 10.6 GHz. The transmit power requirement for UWB communications is that the maximum average transmit Effective Isotropic Radiated Power (EIRP) is −41.25 dBm/MHz in any transmit direction. Additionally, there is a peak power requirement for UWB signals in a given resolution bandwidth (RBW). More specifically, for a RBW of less than 50 MHz, the peak power is required to be limited to 10*log 10(RBW/50).

Due to the lower transmit power levels required of UWB radio transmission, it is desirable to maximize the transmit power of the UWB transmission signals without exceeding the FCC mandated rules. Generally, SNR and associated communication transmission signal quality parameters improve with increased transmission signal power.

It is desirable have a method and apparatus for providing high-power transmission signals within a UWB networking environment without exceeding FCC radiated power requirements.

SUMMARY OF THE INVENTION

An embodiment of the invention includes a method of controlling multiple antenna signal transmission. The method includes adjusting signal parameters so that transmission signals from a plurality of antennas combine to form a directional beam. A time duration in which the transmission signals are adjusted is controlled so that an average EIRP does not exceed a predetermined threshold.

Another embodiment of the invention includes another method of controlling multiple antenna signal transmission. This method includes setting a transmission duty cycle. Signal parameters based on the transmission duty cycle are adjusted so that transmission signals from a plurality of antennas combine to form a directional beam having an average EIRP that does not exceed a predetermined threshold.

Another embodiment includes a method of controlling transmission signals between transceivers of a mesh network. The method includes for each transceiver, adjusting signal parameters so that transmission signals from a plurality of antennas combine to form a beam that is directed towards a particular other transceiver. A time duration in which the transmission signals are adjusted is controlled so that an average EIRP does not exceed a predetermined threshold.

Other aspects and advantages of the present invention will become apparent from the following detailed description, taken in conjunction with the accompanying drawings, illustrating by way of example the principles of the invention.

DETAILED DESCRIPTION

The invention includes an apparatus and method for controlling the time average EIRP of multiple transmission signals that form a beam. The beam is formed having a duty cycle that includes an "active" time duration during which the beam is specifically directed, and an "inactive" time duration during which the beam is turned off or directed elsewhere. The beam can be directed to one of multiple receivers or transceivers. The level of time average transmit EIRP radiated by the beam can be limited to a predetermined level by the duty cycle. Multiple transceivers that include the controlled time average EIRP of multiple transmission signals can be included within a mesh network.

Regulations have been defined that limit the transmit power of UWB transmitters. The regulations include limits on time average radiated transmission power and peak radiated transmission power. The average power regulations, however, are independent of duty cycle. For example, if a transmission signal is on 100% of the time and meets the average power regulation, then the same signal can be transmitted with a 50% duty cycle, and have its average power doubled during the "active" period, and still meet the regulations, as long as the peak power regulation is not exceeded.

Additionally, the power regulations must be satisfied over the full radiation pattern of the transmitter. The (EIRP) must remain within the regulated power limits over all azimuth and elevation angles from the transmitting antenna(s).

Figure 1:
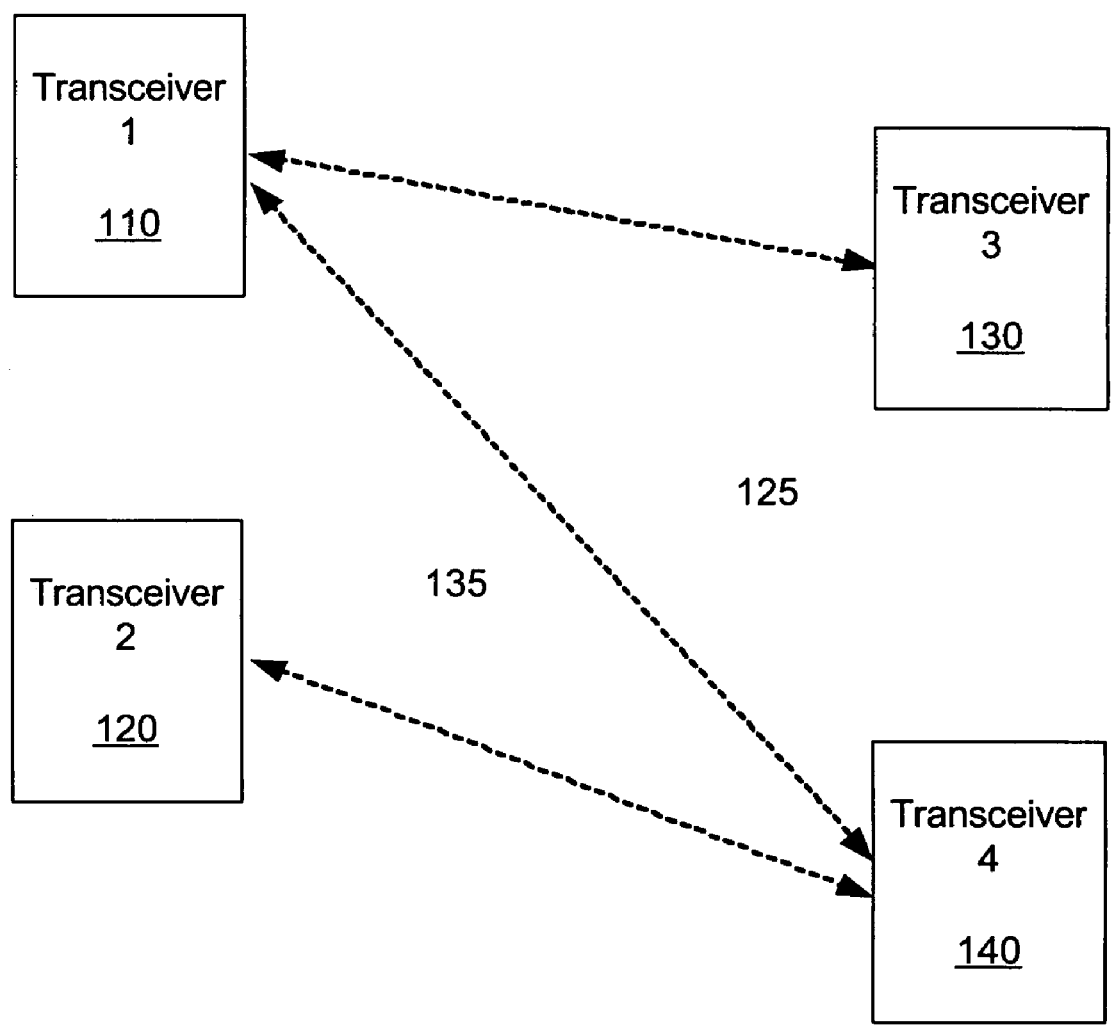
FIG. 1 shows a prior art UWB mesh network.
Figure 2:
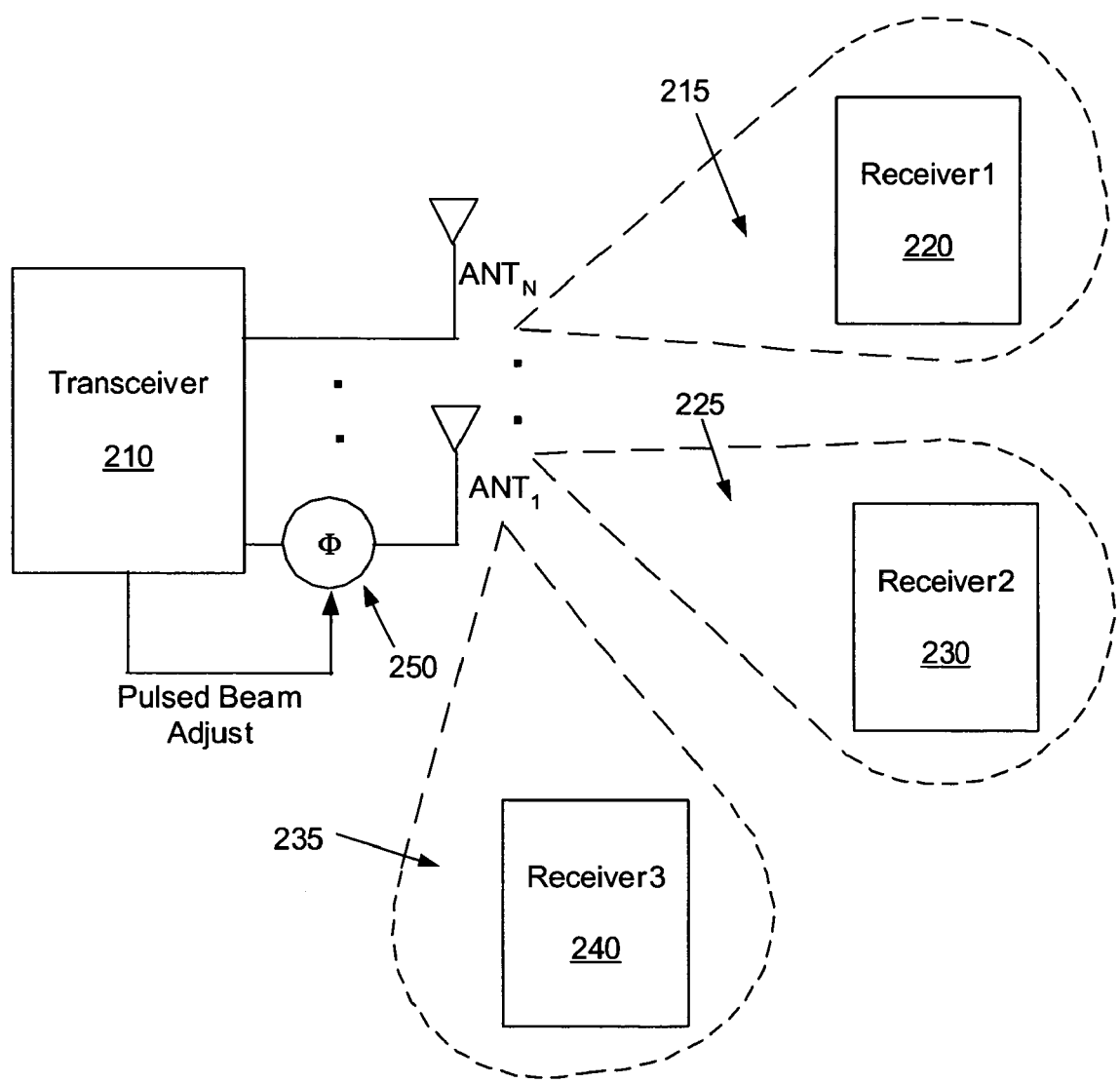
FIG. 2 shows a multiple antenna transmitter and a plurality of target receivers.

FIG. 2 shows a multiple antenna transmitter and a plurality of target receivers. A transmitter 210 includes multiple antennas $ANT_1$ to $ANT_N$. The antennas each transmit a signal, such that the combinations of transmit signals combine to form a beam. The EIRP varies as a function of direction from the transmitter when a beam is formed.

FIG. 2 shows exemplary beams 215, 225, 235 which are formed for communication with several possible receivers 220, 230, 240. More specifically, a first beam 215 is formed by the transmitter 210 when communicating with a first receiver 220, a second beam 225 is formed by the transmitter 210 when communicating with a second receiver 230, and a third beam 235 is formed by the transmitter 210 when communicating with a third receiver 240. The beam targets one receiver at a time. The beam can be directed to enhance the received signal at any of the receivers 220, 230, 240. The shapes of the beams 215, 225, 235 in FIG. 2 are intended as visual depictions of beams. The shapes shown in FIG. 2 may not be realizable.

Beamforming includes directional focusing of antenna patterns on a particular receiver. Beamforming can be advantageous because the directional nature of beamforming increases receive signal power at an intended target receiver, while providing less signal power (interference) at other receivers.

The transmitter 210 includes a beam direction adjust control. As shown in FIG. 2, the beam adjustment control can be provided by a phase shifter 250 that is included within a transmit chain of one or more of the plurality of antennas. Adjusting the phase (one type of signal parameter) as controlled by the phase shifters causes the directional EIRP pattern generated by the multiple antennas to change. Adjustably controlling the time duration that the beam is set for a particular direction, controls the time average EIRP including that of the main lobe of the beam. The time duration that the phase shifters are set to a particular phase, sets the time duration in which the resulting EIRP is higher in certain directions and the received power is higher at a target receiver, or receivers. Therefore, for a particular direction, the transmission EIRP during a time duration (defined by the duty cycle) can be increased while maintaining a predetermined average EIRP by setting the time duration during which the beamforming pattern is maintained. Beamforming can be implemented in other ways than adjusting the phase of signals at an antenna input. For example, phase adjustment of the transmission signals can originate in a baseband signal processor within the transmitter of transceiver. Another exemplary embodiment includes the beam being formed during the "active" time duration of the duty cycle, and transmission signals from the antennas being completely attenuated or turned off during the remaining time of the duty cycle.

An alternate embodiment of FIG. 2 includes controlling the signal parameters given a transmission duty cycle. Factors unrelated to maintaining a specific EIRP, such as transmission scheduling or link communications requirements can influence or fix the transmission duty cycle. Given a fixed duty cycle, the transmission EIRP in a specific direction during an "active" portion of the duty cycle can be controlled by adjusting signal parameters such that transmission signals from a plurality of antennas combine to form a directional beam. The signal parameter selection (phase adjust, amplitude adjust) is made such that the transmit average EIRP does not exceed a predetermined threshold while being controlled by the given or provided fixed duty cycle. The transmission signals are pulsed using the given duty cycle. That is, the directional beam is formed during the "active" portion of the duty given duty cycle. Wireless transmission typically includes a transmission scheduler which can allocate transmission based at least in part on time slots. Typically, the time slots are of fixed time duration. The time duration available for the duty cycle can be constrained by the available transmission scheduling time slots.

Another exemplary embodiment includes using a constant or non-increasing sum of conducted powers of the transmission signals into the antennas when increasing the number of beamforming antennas. That is, for a given transceiver, as the number of antennas used for beamforming varies based on transmission criteria, the sum of the conducted power input to the antennas remains constant. N antennas can be used to form a directional beam. However, for example, doubling the number of antennas used to form the directional beam does not increase the total conducted power input to the antennas. Doubling the number of antennas can include halving the total conducted power input to each of the beam forming antennas, thereby maintaining (not increasing) the sum of conducted powers of the transmission signals.

Figure 3A:
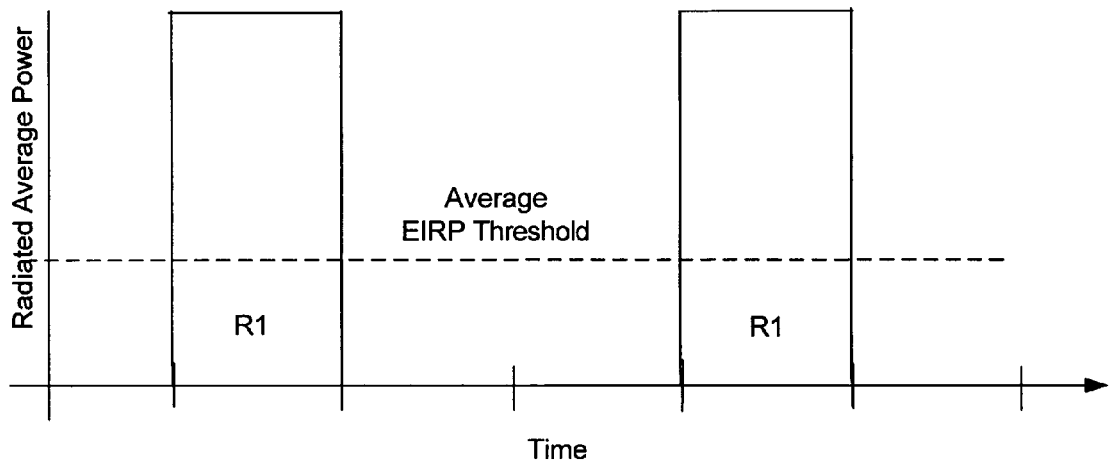
FIG. 3A is a time line representing an average radiated power of transmission signals directed to a target receiver.

FIG. 3A is a time line representing an average EIRP of transmission signals directed to a target receiver during an on period of a duty cycle. As shown, the EIRP of a beam directed, for example, at the first receiver (R1) is pulsed. The time duration and duty cycle of the pulse can be set so that the average EIRP of the beam is below a predetermined threshold. However, the EIRP of the beam during the "active" period of the duty cycle can be higher than the average EIRP. The result is that the first receiver R1 receives transmission signals having a power that is greater than the average EIRP threshold. The transmit EIRP for a time interval (as defined by the duty cycle) can be increased while maintaining a particular average EIRP by reducing the time duration during which the peak power is transmitted. Conversely, the time interval (as defined by the duty cycle) can be increased while maintaining a particular average EIRP by reducing the directional gain of the beam.

Figure 3B:
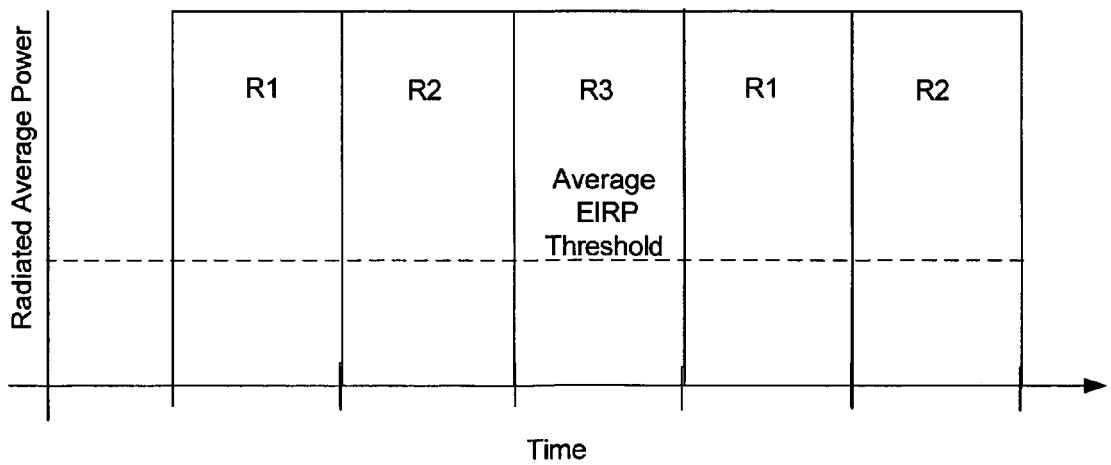
FIG. 3B is a time line representing an average radiated power of transmission signals directed to several target receivers.

FIG. 3B is a time line representing an average EIRP of transmission signals directed to several target receivers that are spatially separated. As shown, each receiver R1, R2, R3 receives signal power of directed beams which are pulsed. The time duration of the pulses can be set so that the average EIRP of the signal is below a predetermined threshold in any spatial direction. However, the average EIRP of the directed beams can be much higher during the transmit ("active") period of the duty cycle. The result is that the each receiver R1, R2, R3 receives transmit signals having a power that is greater than receive power corresponding to the average transmit power threshold. Note that different beamforming configurations may have different EIRPs in different directions. In a specific direction, the average EIRP can be maintained that is lower than the EIRP during the "active" period of the duty cycle. The average EIRP in any direction is dependent upon the beamforming enhanced power being transmitted in the direction, and the time duration and duty cycle in which the power is transmitted in that direction.

Figure 4:
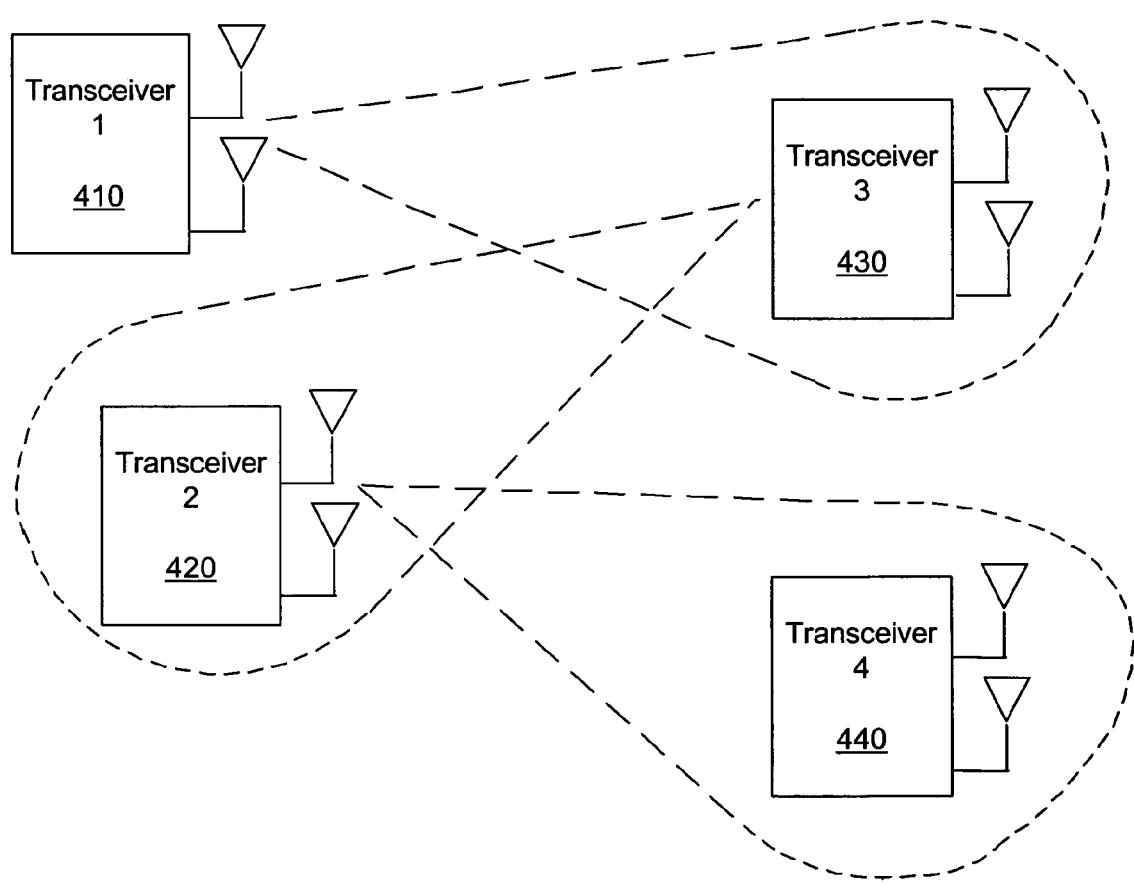
FIG. 4 shows a mesh network of multiple antenna transceivers.

FIG. 4 shows a mesh network of multiple antenna transceivers. Each of the individual transceivers operates in a fashion similar to the transmitter 210 of FIG. 2. As shown, each transceiver 410, 420, 430, 440 includes a plurality of antennas which transmit signals that form beams directed at a target transceiver.

The transmission signals from the multiple antennas of each of the transceivers are controlled to prevent the EIRP in a given direction of the transmission signals from exceeding a predetermined threshold. For each transceiver, signal parameters are adjusted so that transmission signals from a plurality of antennas of the transceiver form a beam that is directed at a particular other transceiver. A time duration in which the transmission signals are controlled to produce a specific beamforming pattern is controlled so that an average EIRP of the combined transmission signals in any direction does not exceed the predetermined threshold.

Figure 5:
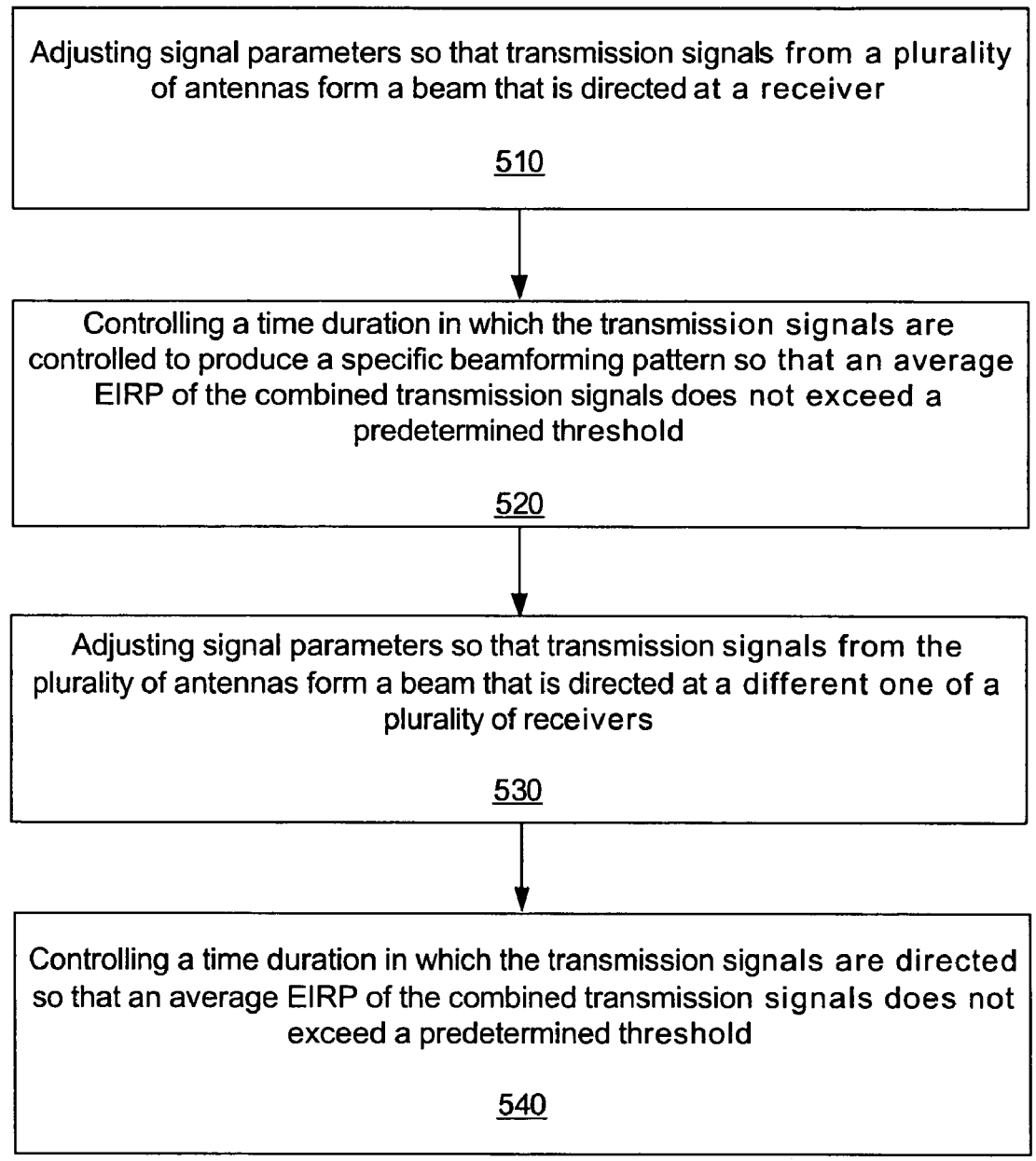
FIG. 5 is a flow chart depicting a method of transmitting multiple signals that combine to direct a beam at a target receiver, and maintain an average radiated power below a threshold.

FIG. 5 is a flow chart depicting a method of transmitting multiple signals that are radiated by multiple antennas to form a gain pattern and maintain an average EIRP below a threshold. A first step 510 includes adjusting signal parameters so that transmission signals from a plurality of antennas form a beam that is directed at a receiver. A second step 520 includes controlling a time duration in which the transmission signals are controlled to produce a specific beamforming pattern so that an average EIRP of the combined transmission signals does not exceed a predetermined threshold. A third step 530 includes adjusting signal parameters so that transmission signals from the plurality of antennas form a beam that is directed at a different one of a plurality of receivers. A fourth step 540 includes controlling a time duration in which the transmission signals are directed so that an average EIRP of the combined transmission signals does not exceed a predetermined threshold.

Each of the plurality of antennas radiate a transmission signal, and the combination of the radiated transmission signals form a beam. The multiple antennas are typically located at a single transmitter, but the antenna can be located at multiple transmission points. The signal parameters that adjust the direction of the beam can include a relative phase or amplitude between transmission signals of the antennas. The time duration of the transmission beams can be controlled by the signal parameters. For example, at least one of the plurality of signals inputs to the antennas of the transmitter can include N relative phase settings. The time duration is controlled by controlling an amount of time each of the relative phase settings between transmission signals is maintained.

Figure 6:
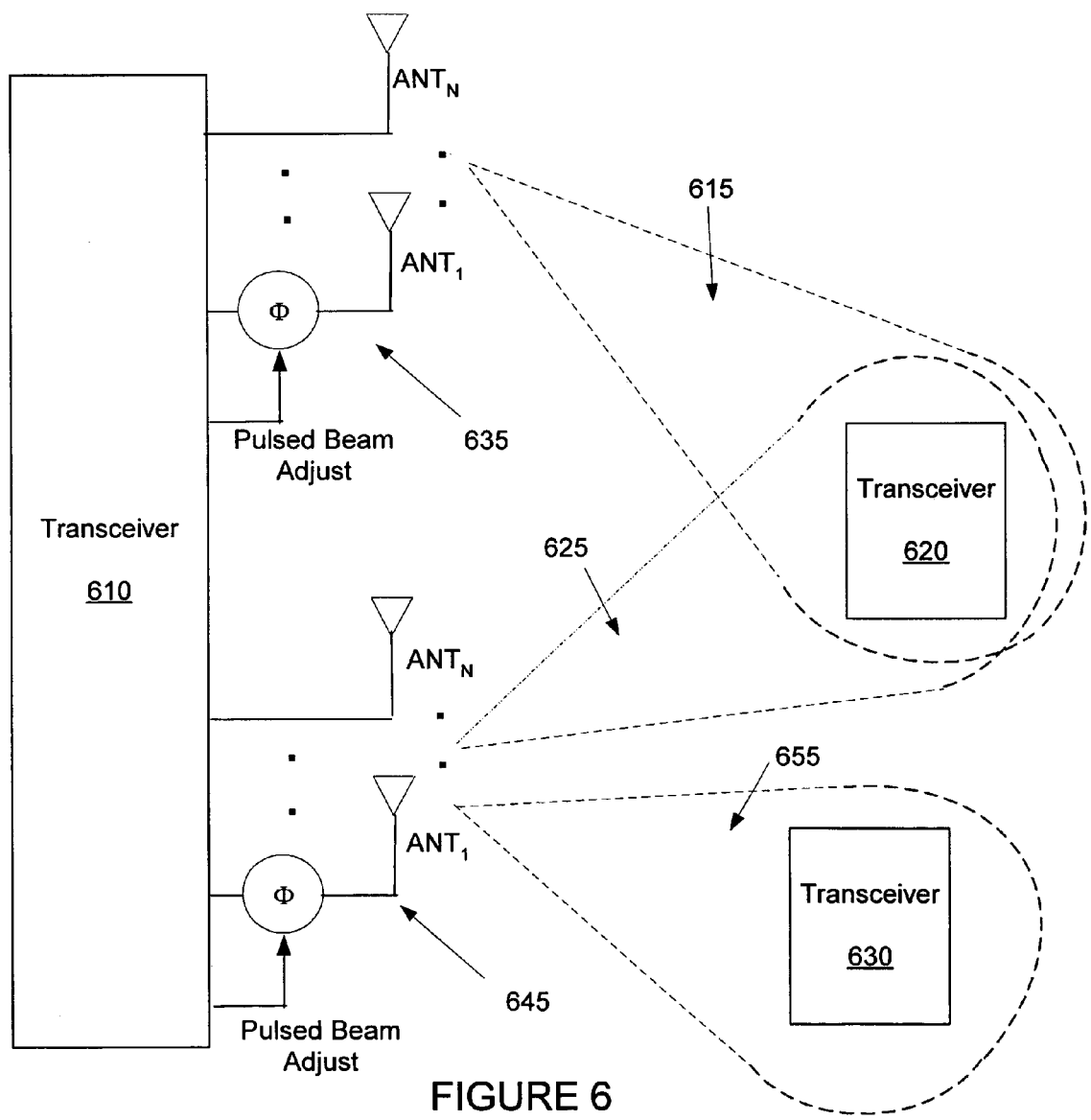
FIG. 6 shows another multiple antenna transmitter.

FIG. 6 shows another multiple antenna transmitter (transceiver). This transceiver 610 includes multiple sets of antennas (for example, a first set of antennas 635, and a second set of antenna 645) in which each set can radiate transmission signals forming a beam (such as beams 615, 625). Each of the beams 615, 625 can be pulse controlled to maintain an average EIRP below a predetermined threshold while providing an EIRP during the "active" portion of the pulse that is greater than the average level.

A transceiver 620 is within the focus direction of the beams 615, 625, and a selection criteria can be used to determine which of the beams 615, 625 provides the best transmission signal. The selection criteria is generally based upon the quality of the received transmission signal of the corresponding beam. The quality can be determined by measuring at least one of several signal quality factors, such as, the SNR of the received signal, the Bit Error Rate (BER) of the received transmission, the Packet Error Rate (PER) of the received transmission, and/or channel estimates between the transceiver 610 and the transceiver 620. The transceiver 610 can also assume symmetry in transmission directions between the transceivers (particularly when transmission in both directions is at the same transmission frequency), and select the subset of antennas and phase settings to form a beam based upon the signals it receives from the transceiver 620. Alternatively, the transceiver 620 can convey back to the transceiver 610 which beam formed by the antennas of the transceiver 610 is the preferred (best quality) beam.

A subset of the total number of antennas available is selected for formation of a beam for data transmission, based upon a selection criteria. Once a subset has been selected, the transmission signals are applied to the selected subset of antennas to form a beam. Control of the beam is performed by adjusting the signal parameters of the transmission signals, and the transmission duty cycle is controlled to maintain the predetermined average EIRP threshold. As previously suggested, the duty cycle ("active" period and "inactive" period) can be controlled by adjusting the phase or amplitude of one or more of the transmission signals.

The selection of the desired subset of antennas is similar to transmit diversity. That is, more than one transmission path is available. The selected transmission path is the transmission path that has the best transmission quality. The transmission quality can include various measures of signal quality including SNR of the received signal, channel estimates, and packet and error rates.

Another exemplary embodiment includes selecting a second subset (for example, the second subset of antennas 645) of available antennas. The second subset of antennas can be selected over other subsets of antennas if the selected second subset provides a better transmission link to a particular second transceiver (such as transceiver 630 located in a different direction) than other available subsets of antennas. The second subset of the total number of antennas available is selected for formation of a beam (such as beam 655) for data transmission, based upon a selection criteria. Once the second subset has been selected, the transmission signals are applied to the selected second subset of antennas to form a second directional beam. Control of the second directional beam 655 is performed by adjusting the signal parameters of the second transmission signals, and the transmission duty cycle is controlled to maintain the predetermined average EIRP threshold. As previously suggested, the duty cycle ("active" period and "inactive" period) can be controlled by adjusting the phase or amplitude of one or more of the second transmission signals. A time duration in which the second transmission signals are adjusted is controlled so that an average EIRP does not exceed a predetermined threshold.

Figure 7:
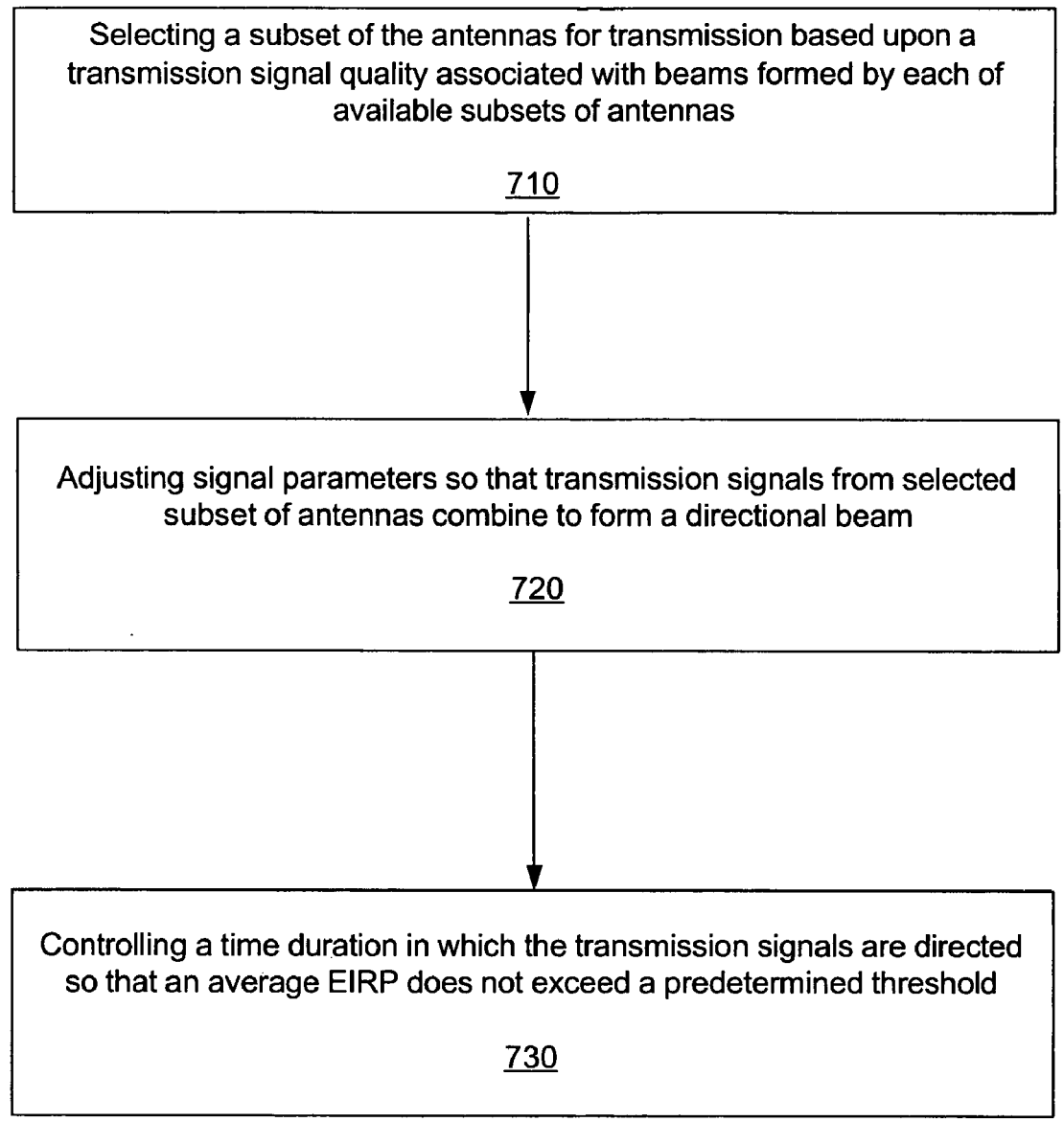
FIG. 7 is a flow chart depicting a method of operating the multiple antenna transmitter of FIG. 6, in which transmitter antennas are selected, and transmission signals input to the antennas are controlled to form a beam.

FIG. 7 is a flow chart depicting a method of operating the multiple antenna transmitter of FIG. 6, in which transmitter antennas are selected, and transmission signals driving the antennas are controlled to form a beam. A first step 710 includes selecting a subset of the antennas for transmission based upon a transmission signal quality associated with beams formed by each of available subsets of antennas. A second step 720 includes adjusting signal parameters so that transmission signals from selected subset of antennas combine to form a directional beam. A third step 730 includes controlling a time duration in which the transmission signals are directed so that an average EIRP does not exceed a predetermined threshold.

Although specific embodiments of the invention have been described and illustrated, the invention is not to be limited to the specific forms or arrangements of parts so described and illustrated. The invention is limited only by the appended claims.

What is claimed:

1. A method of controlling multiple antenna signal transmission, comprising:

adjusting signal parameters so that transmission signals from a plurality of antennas combine to form a directional beam;

controlling a time duration in which the transmission signals are adjusted so that an average EIRP does not exceed a predetermined threshold.

2. The method of claim 1, wherein the beam is directed to a receiver.

3. The method of claim 2, further comprising:

adjusting signal parameters so that transmission signals from the plurality of antennas form a beam that is directed on a different one of a plurality of receivers;

controlling a time duration in which the transmission signals are directed so that an average EIRP of the beam does not exceed the predetermined threshold.

4. The method of claim 1, wherein each of the plurality of antennas radiate a transmission signal, the combination of the radiated transmission signals forming a beam.

5. The method of claim 1, wherein the multiple antennas are located on a single common transmitter.

6. The method of claim 1, wherein a sum of conducted powers of the transmission signals into the antennas does not increase when increasing the number of antennas used to form the beam.

7. The method of claim 1, wherein the signal parameters are adjusted by adjusting a relative phase between transmission signals of the antennas.

8. The method of claim 1, wherein the signal parameters are adjusted by adjusting a relative amplitude between transmission signals of the antennas.

9. The method of claim 1, wherein the time duration is controlled by controlling an amount of time a relative phase between transmission signals is maintained.

10. The method of claim 1, further comprising N relative phase settings between the transmission signals, and the time duration being controlled by controlling an amount of time each of the relative phase settings between transmission signals is maintained.

11. The method of claim 1, wherein the plurality of antennas that are directed are a subset of available antennas, the subset of antennas being selected over other subsets of antennas because the selected subset provides a better transmission link to a particular receiver than other available subsets of antennas.

12. The method of claim 11, wherein the selected subset of antennas are selected through transmission diversity.

13. The method of claim 11, further comprising:
selecting a second subset of available antennas, the second subset of antennas being selected over other subsets of antennas because the selected second subset provides a better transmission link to a particular second receiver than other available subsets of antennas;
adjusting signal parameters so that second transmission signals from second subset of antennas combine to form a second directional beam;
controlling a time duration in which the second transmission signals are adjusted so that an average EIRP does not exceed a predetermined threshold.

14. A method of controlling multiple antenna signal transmission, comprising:
setting transmission duty cycle;
adjusting signal parameters based on the transmission duty cycle so that transmission signals from a plurality of antennas combine to form a directional beam having an average EIRP that does not exceed a predetermined threshold.

15. The method of claim 14, wherein the signal parameters are adjusted by adjusting a relative phase between transmission signals of the antennas.

16. The method of claim 14, wherein the duty cycle is controlled by controlling an amount of time a relative phase between transmission signals is maintained.

17. The method of claim 14, further comprising N relative phase settings between the transmission signals, and the duty cycle controlling an amount of time each of the relative phase settings between transmission signals is maintained.

18. The method of claim 14, wherein adjusting the signal parameters comprises forming a directional beam during an "active" portion of the transmission duty cycle, and ceasing transmission during an "inactive" portion of the transmission duty cycle.

19. A method of controlling transmission signals between transceivers of a mesh network, the method comprising:
for each transceiver, adjusting signal parameters so that transmission signals from a plurality of antennas combine to form a beam that is directed towards a particular other transceiver;
controlling a time duration in which the transmission signals are directed so that an average EIRP does not exceed a predetermined threshold.

20. The method of claim 19, wherein the time duration is controlled by a transmission scheduler that allocates time slots in which each transceiver transmits to other transceivers, the time duration being determined by the number of time slots allocated for transmission.

21. The method of claim 19, wherein the signal parameters are adjusted by adjusting a relative phase between transmission signals of the antennas.

22. The method of claim 19, wherein the signal parameters are adjusted by adjusting a relative amplitude between transmission signals of the antennas.

23. The method of claim 19, wherein the time duration is controlled by controlling an amount of time a relative phase between transmission signals is maintained.

24. The method of claim 19, further comprising N phase relative phase settings between the transmission signals, and the time duration being controlled by controlling an amount of time the relative phase settings between transmission signals is maintained.

25. The method of claim 19, wherein the plurality of antennas that are directed are a subset of available antennas, the subset of antennas are selected for providing a beam having transmission quality characteristics that are better than other subsets of available antennas.

26. A transceiver comprising:
a plurality of antennas;
means for controlling an antenna pattern generated by a sum of radiated signals from the antennas by adjusting signal parameters of input signals to the antennas so that transmission signals from a plurality of antennas combine to form a directional beam;
means for controlling a time duration in which the transmission signals are directed so that an average EIRP does not exceed a predetermined threshold.

27. The transceiver of claim 26, further comprising:
means for adjusting signal parameters so that transmission signals from the plurality of antennas form a beam that is directed to one of a plurality of receivers;
means for controlling a time duration in which the transmission signals are directed so that an average EIRP of the beam does not exceed the predetermined threshold.

28. The transceiver of claim 27, wherein the time duration is controlled by controlling an amount of time a relative phase between transmission signals is maintained.

* * * * *